June 19, 1951                J. R. MOREY                 2,557,305
              PLIER FOR FORMING AND SHEARING OFF
                     SPECTACLE LENS BRACKETS
                       Filed Dec. 17, 1947
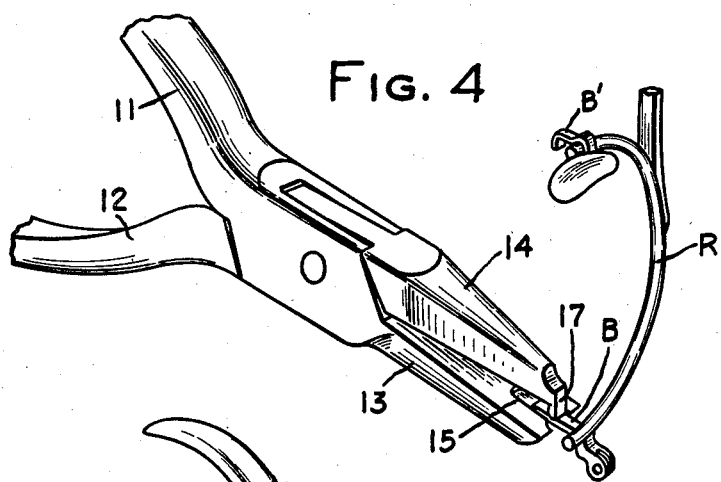
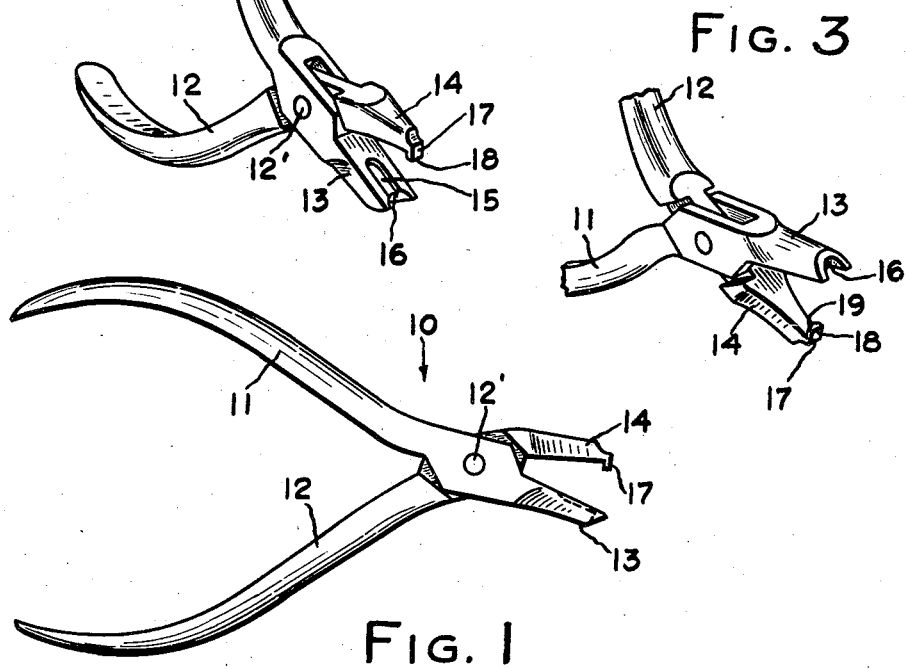
Inventor
JOHN R. MOREY
By  *G. A. Ellestad*
Attorney Patented June 19, 1951

2,557,305

UNITED STATES PATENT OFFICE 2,557,305

PLIER FOR FORMING AND SHEARING OFF SPECTACLE LENS BRACKETS

John R. Morey, Brighton, N. Y., assignor to Bausch & Lomb Optical Company, Rochester, N. Y., a corporation of New York Application December 17, 1947, Serial No. 792,239

3 Claims. (Cl. 81—3.6)

This invention relates to pliers and more particularly it has reference to pliers which are used for forming and shearing off lens brackets or the like on spectacle mountings.

In certain types of semi-rimless spectacle mountings, the lenses are held in place by means of prongs or brackets which extend forwardly from the mounting, engage notches formed in the nasal and temporal edges of the lenses and have their ends bent over at substantially right angles so as to engage the front surfaces of the lenses. When such mountings are supplied to the optician, the lens prongs or brackets are substantially straight and of sufficient length to accommodate lenses of varying thicknesses. In attaching a lens, the optician marks the bracket in accordance with the edge thickness of the lens and then bends the bracket over at a substantially right angle so that the bracket will snugly engage the front surface of the lens. The end of the bracket is then cut off so that it will not be conspicuous on the front face of the lens. The ends of all of the brackets on a spectacle should, of course, be cut off so as to present a uniform appearance.

One of the objects of my invention is to provide a plier which will greatly facilitate the attachment of lenses to spectacle mountings of the type described. Another object is to provide a plier for forming and shearing lens brackets on spectacle mountings of the type described. These and other objects and advantages reside in certain novel features of construction, arrangement and combination of parts as will hereinafter be more fully described and pointed out in the appended claims.

Referring to the drawings:

Fig. 1 is a side view of a plier embodying my invention.

Fig. 2 is a perspective view of the plier with the jaws in open position.

Fig. 3 is a fragmentary view with the jaws in a position inverted from that shown in Fig. 2.

Fig. 4 is a perspective view illustrating the use of my plier on a spectacle mounting.

A preferred embodiment of my invention is disclosed in the drawing wherein 10 indicates, generally, a plier comprising members 11 and 12 pivoted at 12' and having, respectively, the jaws 13 and 14. As more clearly shown in Fig. 2, the jaw 13 has an elongated recess 15 formed on its inner face. The bottom of the recess 15 extends outwardly towards the end of the jaw 13 and terminates in an arcuately curved shearing edge 16. As shown in Fig. 3, the jaw 14 has a projection 17 extending upwardly from its inner surface. The top face of the projection 17 is substantially flat and is bounded by a straight edge 18 which lies in the plane of the front side of the projection which is flush with the end of the jaw 14. The inner side of the face of projection 17 has an arcuately curved shearing edge 19 which is adapted to cooperate with the shearing edge 16 on the jaw 13.

The operation of my device is illustrated in Fig. 4 wherein there is shown a portion of a spectacle mounting comprising a rim member R which is adapted to be placed in contact with the rear surface of the spectacle lens adjacent the upper edge thereof. The lens is held in position by bracket members B, B' which are adapted to engage notches formed in the temporal and nasal edges of the lens. When the optician receives the mounting, the brackets are substantially straight and extend forwardly from the rim member R. In attaching the lens, the optician first places it with its rear surface against the inner face of rim member R and then marks the bracket with a scratch awl in accordance with the thickness of the lens.

The bracket is then placed in the recess 15 of the plier and the edge 18 in alignment with the scratch mark on the bracket. The bracket is then gripped between the face of the projection 17 and the recess 15 and bent around the edge 18 as a fulcrum through a substantially right angle, as shown at B'. Without removing the plier, added pressure on the handles causes the coacting shearing edges 16 and 19 to cut off the free end of the bracket. Fig. 4 shows the plier as it is positioned to grip the bracket B while the formed and cut off bracket will appear as at B'. By this procedure, the brackets are expeditiously formed and all of the ends are cut off so that the bent over portions of the brackets which contact the front surface of the lens will be of uniform length.

From the foregoing, it will be apparent that I am able to attain the objects of my invention and provide an efficient plier for forming and cutting off the lens brackets on spectacle mountings.

The forming and cutting off operations are performed successively after the bracket has been gripped by the plier. This effects a substantial saving in time and also insures that the front ends of the bracket which contact the front face of the lens will be of uniform length. While the cooperating shearing edges 16 and 19 are arcuately curved, it is obvious that they could have other desired configurations. Although the recess 15 in jaw 13 facilitates the holding of the lens bracket, it is not necessary that the recess be provided since the bracket could be gripped between the face of jaw 13 and the top face of the projection. Various other modifications can obviously be made without departing from the spirit of my invention as pointed out in the appended claims.

I claim:

1. A plier of the type described comprising a pair of jaws pivotally mounted for movement into opposed relation with each other, the first jaw having a shearing edge adjacent its free end, the second jaw having a projection extending above the surface of the jaw, said projection having a flat top face substantially parallel to the first jaw and a straight edge which is substantially flush with the free end of the second jaw whereby a lens bracket on a spectacle mounting may be grasped between the first jaw and the face of the projection and bent about said straight edge as a fulcrum, said projection also having a shearing edge adapted to coact with the shearing edge on said first jaw to cut off the free end of the bracket.

2. A plier of the type described comprising two jaws movable towards each other, one of the jaws having a surface bounded by a contoured shearing edge in the plane of said surface, the other jaw having a projection extending above its surface, one edge of the projection being substantially straight and flush with the free end of said other jaw, the other side of the projection having a contoured shearing edge adapted to cooperate with the first-named shearing edge, said projection having a surface which is substantially flat and faces the first-named jaw whereby a flexible prong or the like may be gripped between said first-named surface and the top of the projection and bent about the straight edge of the projection and then selectively cut by means of the shearing edges.

3. A plier of the type described comprising a pair of pivotally connected jaws, the first jaw having a recess in its surface adjacent the end of the jaw, the recess terminating in a shearing edge of a predetermined contour, a projection extending above the surface of the second jaw, said projection having a substantially flat top face which is parallel to the surface of the first jaw bounded on one side by a straight edge which is flush with the end of the second jaw whereby a lens bracket of a spectacle mounting may be gripped and held within said recess and bent about said straight edge as a fulcrum, said face also being bounded by a shearing edge of a predetermined contour which cooperates with the shearing edge on the first jaw whereby the bracket may be cut off by the shearing edges.

JOHN R. MOREY.

REFERENCES CITED

The following references are of record in the file of this patent:

UNITED STATES PATENTS

| Number | Name | Date |
| --- | --- | --- |
| 311,121 | Hair | Jan. 20, 1885 |
| 499,637 | Knight | June 13, 1893 |
| 1,454,475 | Hughes | May 8, 1923 |
| 1,812,350 | Lingwood | June 30, 1931 |
| 1,922,681 | Heise | Aug. 15, 1933 |